United States Patent [19]
McDowall et al.

[11] Patent Number: 6,128,004
[45] Date of Patent: Oct. 3, 2000

[54] VIRTUAL REALITY GLOVE SYSTEM WITH FABRIC CONDUCTORS

[75] Inventors: Ian E. McDowall, Palo Alto; Mark T. Bolas, Mountain View; Russell C. Mead, Jr., San Francisco; Christian Greuel, Boulder Creek, all of Calif.

[73] Assignee: Fakespace, Inc., Mountain View

[21] Appl. No.: 08/623,528

[22] Filed: Mar. 29, 1996

[51] Int. Cl.[7] .................................................. G09G 5/08
[52] U.S. Cl. .......................................... 345/158; 345/156
[58] Field of Search .................................. 345/156, 157, 345/158

[56] References Cited

U.S. PATENT DOCUMENTS

| | | | |
|---|---|---|---|
| 1,046,225 | 12/1912 | Schindler . | |
| 4,414,537 | 11/1983 | Grimes | 340/365 |
| 4,540,176 | 9/1985 | Baer | 463/37 |
| 4,613,139 | 9/1986 | Robinson | 273/148 |
| 4,988,981 | 1/1991 | Zimmerman et al. | 340/709 |
| 5,184,319 | 2/1993 | Kramer | 364/806 |
| 5,280,265 | 1/1994 | Kramer et al. | 128/782 |
| 5,442,729 | 8/1995 | Kramer et al. | 128/782 |
| 5,526,022 | 6/1996 | Donahue et al. | 345/156 |
| 5,581,484 | 12/1996 | Prince | 345/173 |

OTHER PUBLICATIONS

Foley, Interfaces For Advanced Computing, XX Scientific American 126 (Oct. 1987).

*Primary Examiner*—Matthew Luu
*Attorney, Agent, or Firm*—K. David Crockett; Crockett & Crockett

[57] ABSTRACT

A data input glove for use with a computer system, virtual reality system or the like, with numerous electrodes place on the glove and interconnected with electronic controls enabling sensing of contact between any combination of the electrodes, with electrodes made of flexible electrically conductive fabric, silk-screened electrically conductive paint or the like.

1 Claim, 7 Drawing Sheets

FIG.5-A
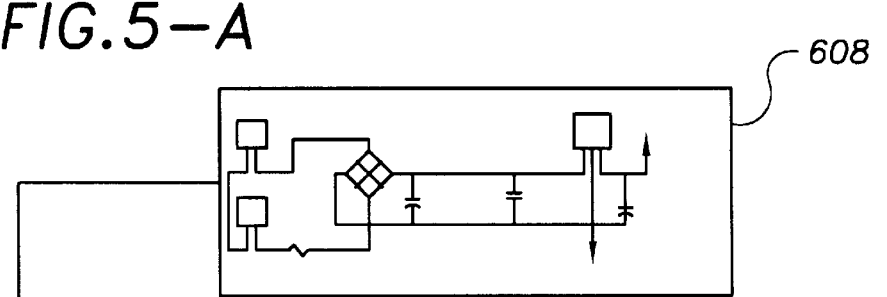
608
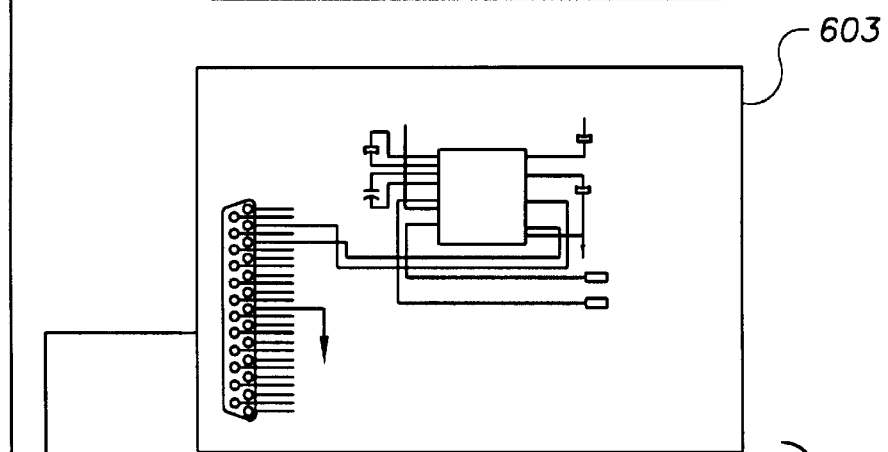
603
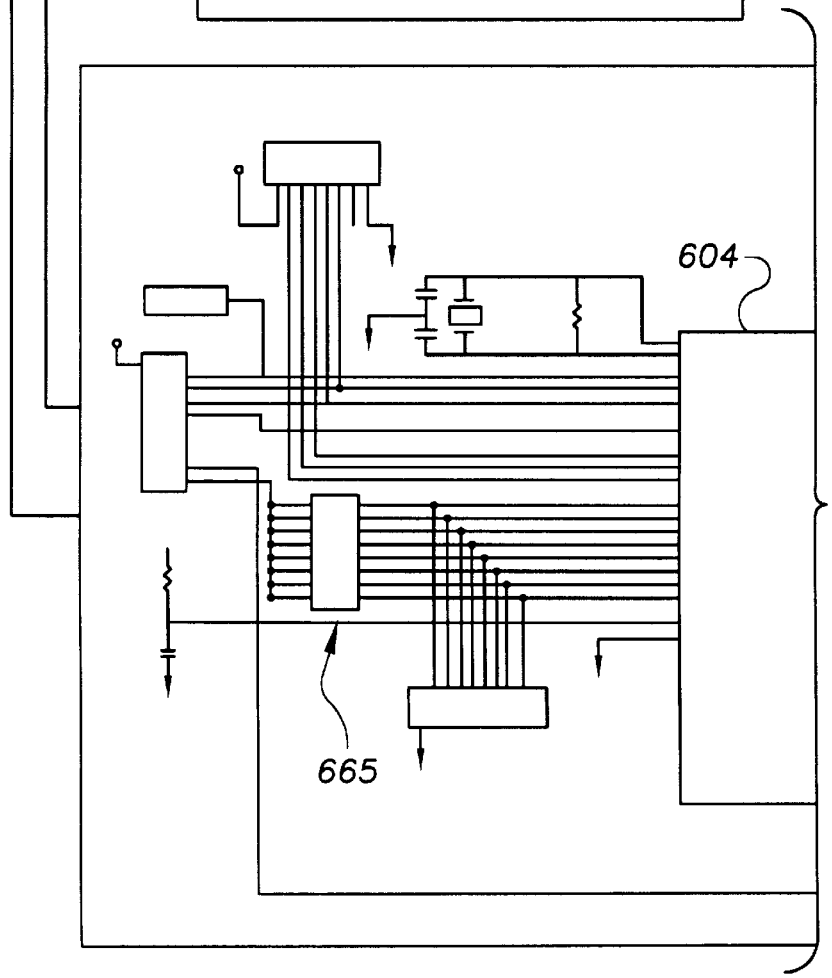
604
665
TO
FIG.5-B

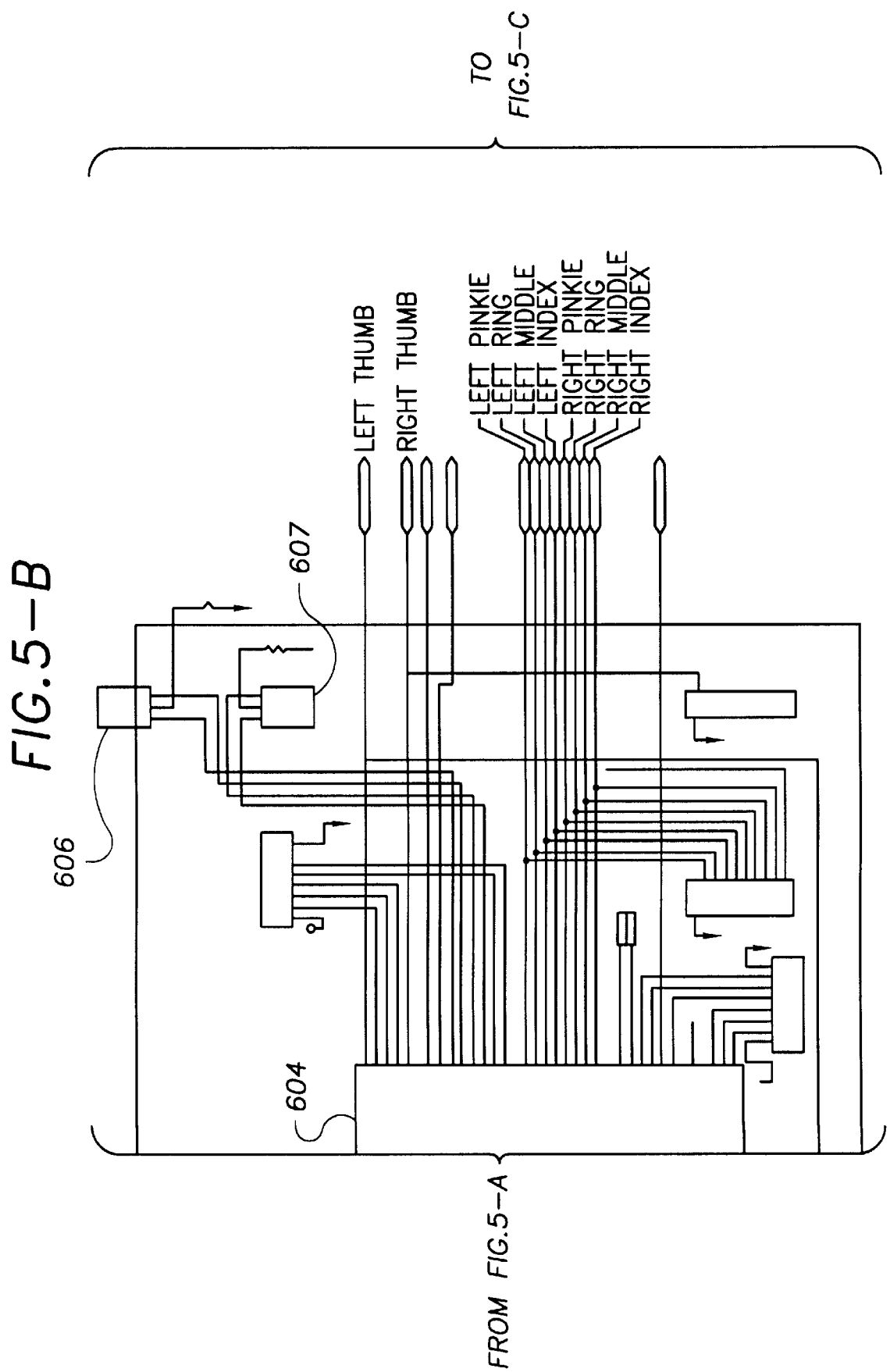

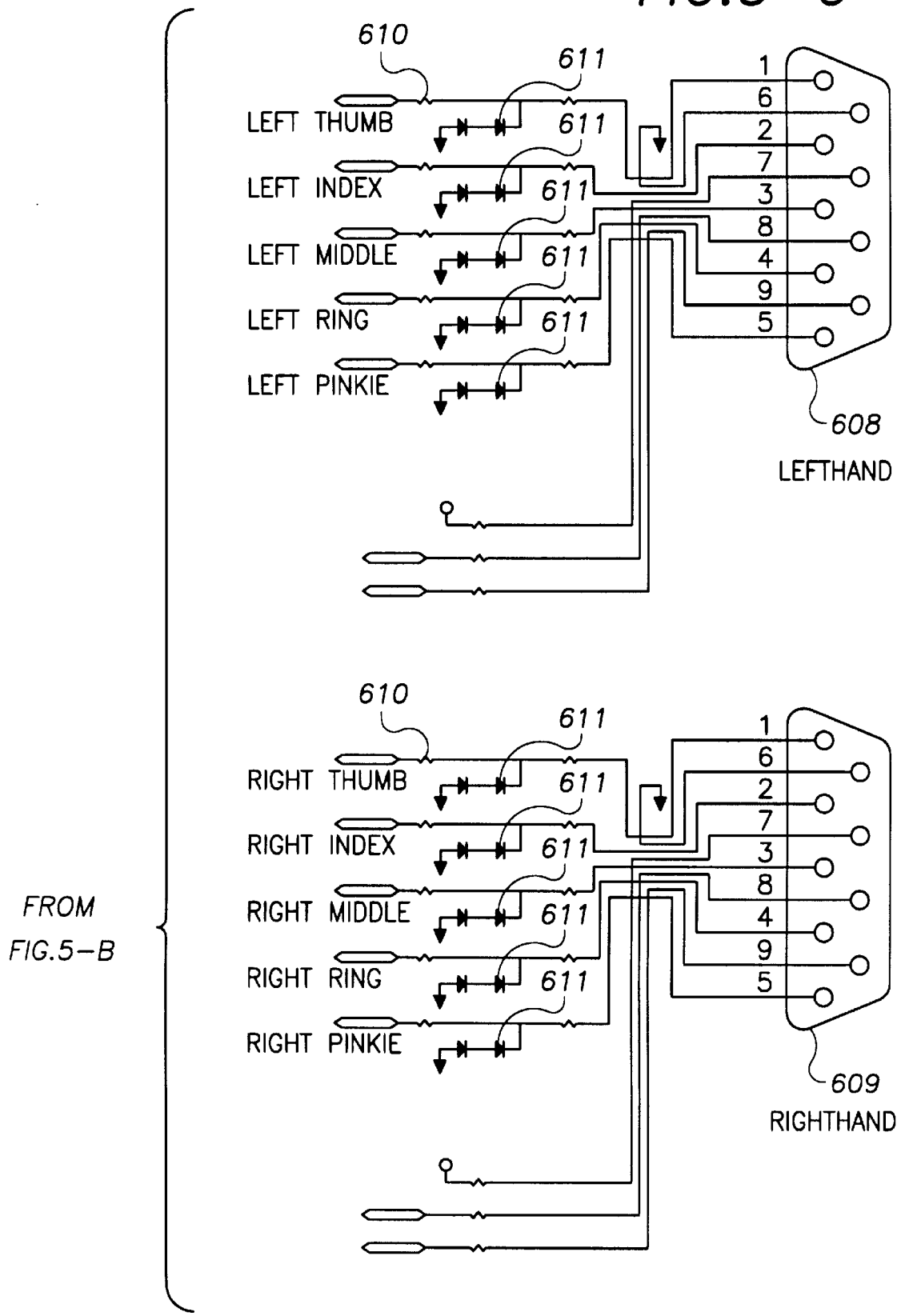
FIG.5-C

VIRTUAL REALITY GLOVE SYSTEM WITH FABRIC CONDUCTORS

FIELD OF THE INVENTION

This invention relates to devices for translating body movements into electrical or electronic signals, and to data glove input devices.

BACKGROUND OF THE INVENTION

Computer systems now use a variety of input devices, including keyboards, mice, graphics tablets, light pens, touch sensitive screens. Recently, computer systems used in virtual reality systems and other complex systems (such as remote control robotics and weapons systems) have adopted additional input devices, including head-mounted sensors, infrared eye-lens sensors, and data gloves. These devices sense movement of the body through a variety of sensors, and send signals to the computer system to indicate the position of the body.

Data gloves have been proposed for use as input devices for computer systems. For example, the data glove developed by VPL Research, Inc., and illustrated in, Interfaces for Advanced Computing, Scientific American (October 1987) (And also the subject Zimmerman, Computer Data Entry and Manipulation Apparatus and Method, U.S. Pat. No. 4,988,981 (Jan. 29, 1991)) used fiber-optic flexion sensors to determine how much each finger on the glove is bent. The glove also used an ultrasonic position sensor and a mercury switch orientation sensor mounted on the back-hand surface of the glove to determine the location of the glove and send this information to the computer used with the glove.

Grimes, Digital Data Entry Glove Interface Device, U.S. Pat. No. 4,414,537 (Nov. 8, 1983) proposed a data glove designed to replace a computer keyboard. This glove used flex sensors and electrical contacts on the fingertips to determine static positions representing the characters of the alphabet. Kramer, Force Feedback and textures Simulating Interface Device, U.S. Pat. No. 5,184,319 (Feb. 2, 1993) shows a data glove using strain gauges attached to the fingers of the to sense the bend of fingers, and to transmit this information to a computer. Robinson, Video Control Gloves, U.S. Pat. No. 4,613,139 (Sep. 23, 1986) proposes use of a glove with contacts on the fingertips to be used as an input device for a video game.

The data gloves can be used in virtual reality environments or "worlds" with varying degrees of complexity. The are potentially useful for selection of virtual object in a virtual environment. By correlating the position of the hand and the shape of the hand as sensed by the sensors on the glove to the position, shape and assigned function of a virtual object within the virtual environment, the host computer can interpret hand positions as instructions to manipulate the objects. More simply, by sensing the shape of the hand, the host computer can interpret the input as commands to the host system. For example, the Zimmerman device was designed to correlate contact between the thumb and other fingers to letters of the alphabet, and gestures are interpreted as commands to enter letters into a computer word processing file. In the Robinson device, contact between the thumb and the fingers were to be interpreted by the host computer as instructions in a video game program.

In flex sensing gloves, the glove can sense whether the glove is bent or not, but cannot accurately sense the degree of bend. In general, glove flexion of the fingers has not been used for rate control because the sensing is too difficult and the feedback to the user is not sufficiently accurate for efficient control. Virtual environment parameters such as the speed of flying have not generally been tied to the degree of the bend of a finger, and the firmness of grasp is not tied to how tightly a fist is made.

The electronics required for use of the touch sensing gloves is relatively straightforward when compared with the electronics required for measurement and calibration of a number of strain gauges attached to the back of the hand or measuring the angles in an mechanical or fiberoptic exoskeleton attached to the hand.

One shortcoming of flexion gloves is the absence of easily understood feedback to the operator of the glove. The degree of bend, in systems that are sensitive enough to use that information, may be misinterpreted by the system, or the system may be or become miscalibrated, so that the bend interpreted by the computer is significantly different than the actual bend accomplished by the operator. Deviation between the actual bend and the interpretation by the computer can be difficult to detect. Contact gloves overcome this shortcoming, in that they provide positive feedback to the operator because the operator can feel the contact between the thumb and fingers. After operating the system for a while, the operator will expect the host computer to react in known ways to the contact which the operator can feel. Any deviation should be easy to perceive. The disadvantage of prior art contact gloves, however, is that they cannot interpret multiple simultaneous gestures, or gestures that involve fingers other than a chosen signal finger (usually the thumb), and they do not account for cross hand contact.

SUMMARY OF THE INVENTION

The data gloves described below use flexible conductive electrical contacts on the fingertips, the back of the fingers, the palms and other surfaces of the hand. The contacts are electrically connected to the host computer system via an electronic control box which energizes each finger in turn while monitoring all other contacts for electrical signal that indicates contact between the energized finger and the other fingers and contacts. The electrical contacts are isolated from the system through surge suppresser diodes to protect the system from static discharge. A multiplexor chip on the glove itself limits the number of electrical connections that must be provided to energize the glove and send signals back to the control box or host computer.

Many of the actions that users wish to perform with gloves such as flying in a particular direction, picking up an object, selecting an item on a menu, or some other type of "choosing" task, can be represented by the contact between two or more digits. The gloves and control system enable the operator to provide input to a computer system with any combination of contacts between the numerous electrodes on the glove. The gloves and control system allow the operator to interact with a computer program, to interact with a virtual world, and to manipluate objects in a virtual environment. The gloves also enable an operator to manipulate remote systems through computer interfaces. The gloves may also be used merely to monitor the movements of the wearer.

It will be appreciated from the description of the data input gloves and control system that they may be used in many environments and made in many embodiments. In fact, the glove is but one embodiment, and the inventive concepts, methods and devices described below may be employed on any article of clothing, any part of the body, or upon any machine or object in order to detect motion and interaction of the thing. For example, the inventions could be embodied in a pair of sleeves worn by robotic arms, and the data derived therefrom can be used as feedback to ensure that the robotic arms are (or are not) coming into contact with themselves, other parts or the robot, parts of its environment, as intended by the robotic control system.

BRIEF DESCRIPTION OF THE DRAWINGS

FIG. 5 is a schematic of the glove control electronics.

DETAILED DESCRIPTION OF THE INVENTION

1. Glove Construction

Figure 1:
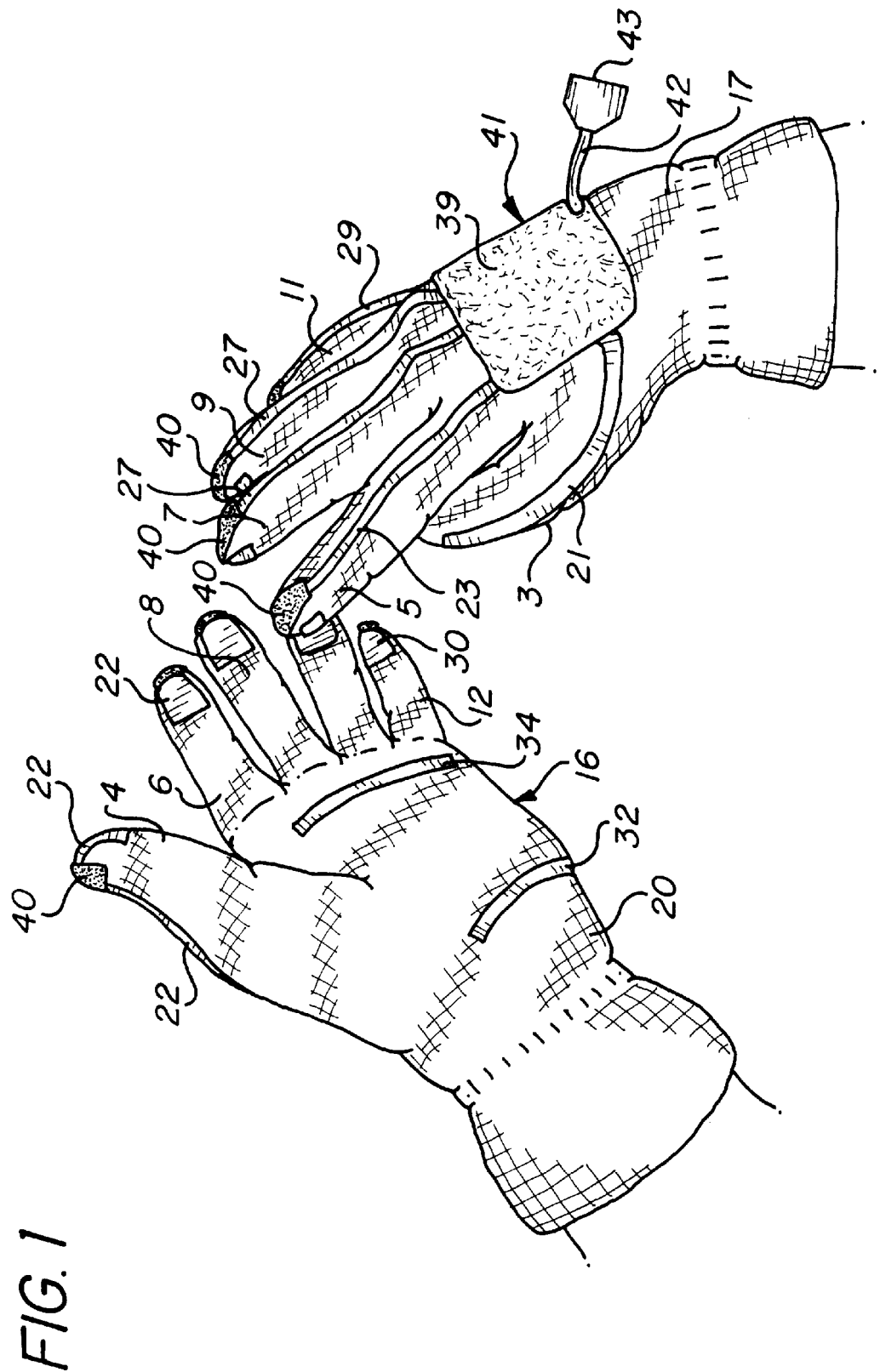
FIG. 1 shows a pair of data gloves with flexible conductive fabric electrodes.

FIG. 1 shows a pair of gloves, the right hand glove 1 and the left hand glove 2. The gloves, including electrical touch sensing contacts, are made of fabric, including several different fabrics chosen for functionality. The back of the right glove 17, shown on the right hand glove 1, is made of lycra, and may be made in several pattern sections sewn together to form the entire back hand side of the glove. The palm of the glove 20, visible on the left glove, is made of siree, a fabric which is preferred for it comfort and ruggedness. Electrical connections on the back of the glove are protected by cloth cover 39, which is preferably made of Velcro® so that a tracker may be releasably mounted on the back of the hand. The tip of each finger is provided with protective covers 40, preferably of ultrasuede.

Visible in FIG. 1 are the electrodes for the right hand fingers, thumb electrode 21 on the radial surface of the right thumb 3, index finger electrode 23 on index finger 5, middle finger electrode 25 on middle finger 7, ring finger electrode 27 on ring finger 9, and pinkie finger electrode 29 on the pinkie 11. Visible on the left hand shown in FIG. 1 are the fingertip portion of the electrodes, including the thumb electrode 22 on the radial surface of the left thumb 4 and also on the tip of the left thumb, the index finger electrode 24 on the left forefinger 6, and so on. On the palm of the left hand, heel electrode 32 is seen on the heel 20 of the left palm, and distal crease electrode 34 is seen on the palm near the distal crease 16.

The electrical contacts on each finger are made of metallic fabrics which provide strength, stretchability, and a high-degree of ruggedness. The metalized fabric conductors run along the backs of the fingers, looping over the tops of the fingers and covering the pad of the fingertips to form the fingertip electrodes. The fabric electrode pads on the fingertips are sewn around the edges and, in some cases, a strip of material around the edges helps prevent the conductive fabric from lifting up or peeling away from the base fabric in the corners.

A number of different metallic fabrics may be used for the conductive fabrics. Metallic fabrics that are created through electroless copper deposition, and also stainless steel, mesh-type fabrics work well. The stainless steel mesh-type fabric is preferred for its ruggedness. The conductive fabric has the feel of a medium weight fabric, and the strips may be sewn onto the glove using standard applique techniques, or they may be applied with adhesives or any other suitable method of glove fabrication. Suitable wire mesh and other materials are commercially available from McMaster-Carr in Los Angeles, Calif., Howard Wire Cloth Co. Of Hayward, Calif. and various other manufacturers.

The conductive paths may also be created with a silk screen process or other deposition process such as electro-chemical deposition. Silk screening was accomplished with a commercial silk screening assembly and metallized and conductive silver based paint which is commercially available from Mavidon Corporation (product number K652).

The conductive path down the back of the finger stretches with the lycra to accommodate different hand sizes. The conductive fabric goes along the outside of the glove across the fingertip and thus cannot be bent, fully creased, as it were, across the fingertip as the glove is removed because it passes over the seam of the lycra and siree material for the palm underneath. This prevents the metallic fabric from being broken at the fingertips due to excessive fatigue cycles caused by repeated removal of the gloves by the customary pinching of the fingertips.

In an alternative embodiment, the back hand panel of the gloves may be constructed with a double layer of lycra, with the additional layer being placed under the operative layer. In this embodiment, the metallic strips are attached to the outer lycra layer and the lycra layers are then sewn together at the edges. This construction ensures that holes sewn that penetrate the stainless steel fabric and the lycra base, and potentially stray threads or fibers from the conductive fabric that may be pushed through the lycra during sewing cannot come into direct contact with the skin.

The conductors which run down the back of the hand to the dorsal area 41 where contact with the electronic control box is accomplished. In its simplest form, conductive fabric strips are potted to corresponding wires in cable 42 which then connects to the electronics box through connectors 43 on the right glove and 44 on the left glove. Alternately, the wires and conductive fabric strips may be crimped together, or soldered onto a PC board to complete the circuit. The dorsal area of the glove is potted with an adhesive so that that area of the glove does not stretch so that the contacts cannot be broken. This potting also serves to provide a rigid, flat area above which velcro® patch 39 may be placed.

The tracker mount is removable Velcro and, by virtue of a number of different hole patterns, is compatible with a number of different trackers. This feature is especially important because the hole pattern for trackers is not standardized at the present time and compatibility between different trackers is important to many users. Tracker of various construction are available, for example electromagnetic trackers are available from Polhemus Corp. Ultrasound trackers and systems are also available.

Figure 6:
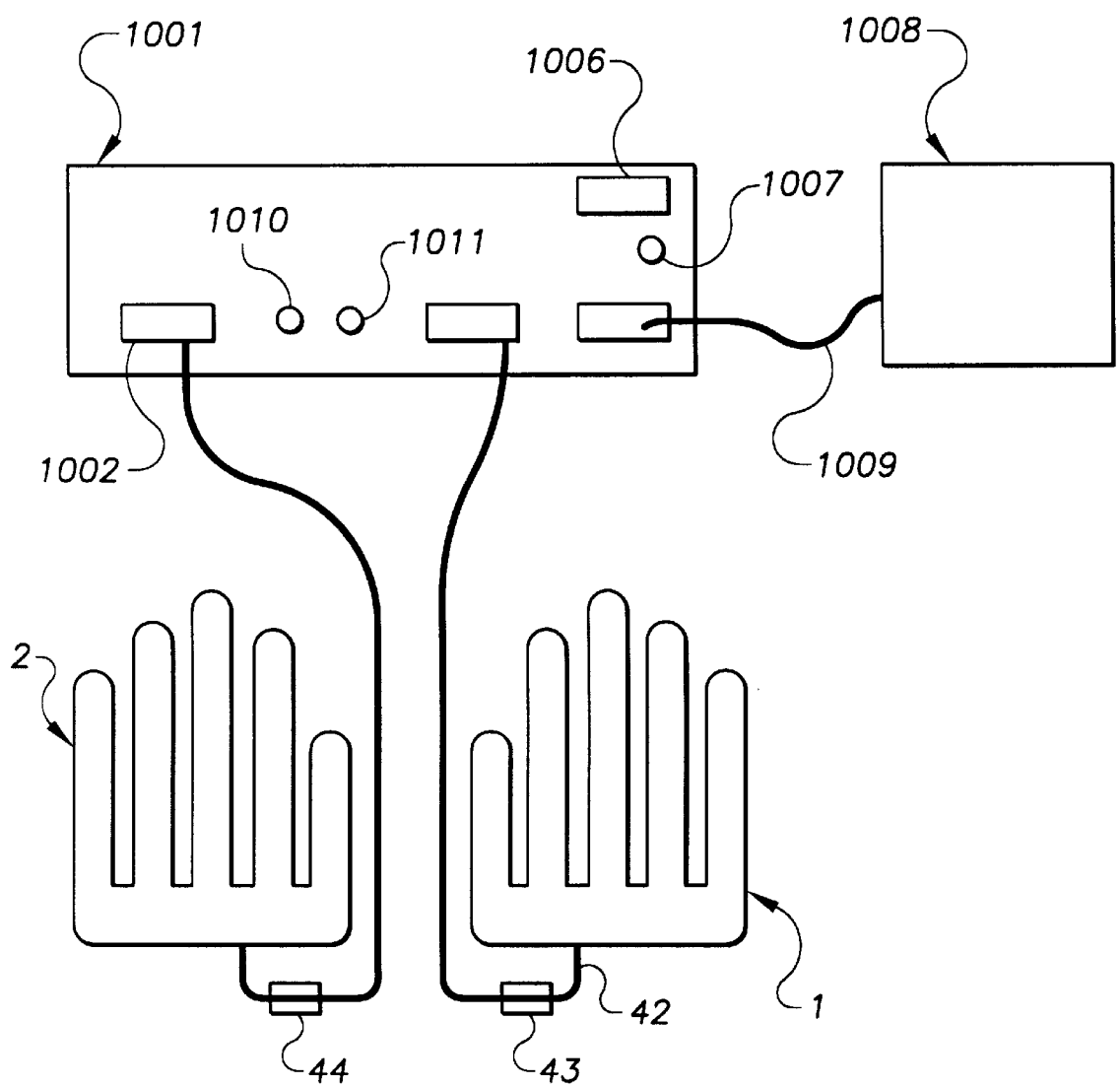
FIG. 6 is a schematic diagram of the glove system.

FIG. 6 shows the glove system, including gloves 1 and 2, electronic control box 1001, and the host computer system

1008. The gloves connect to the electronics at connectors 1002 and 1005. The condition of each glove is indicated by indicators 1010 and 1011. The glove electronics can be turned on and off by switch 1006 and are powered by input 1007. The glove electronics communicate with the host computer 1008 through serial interface 1009.

Figure 2:
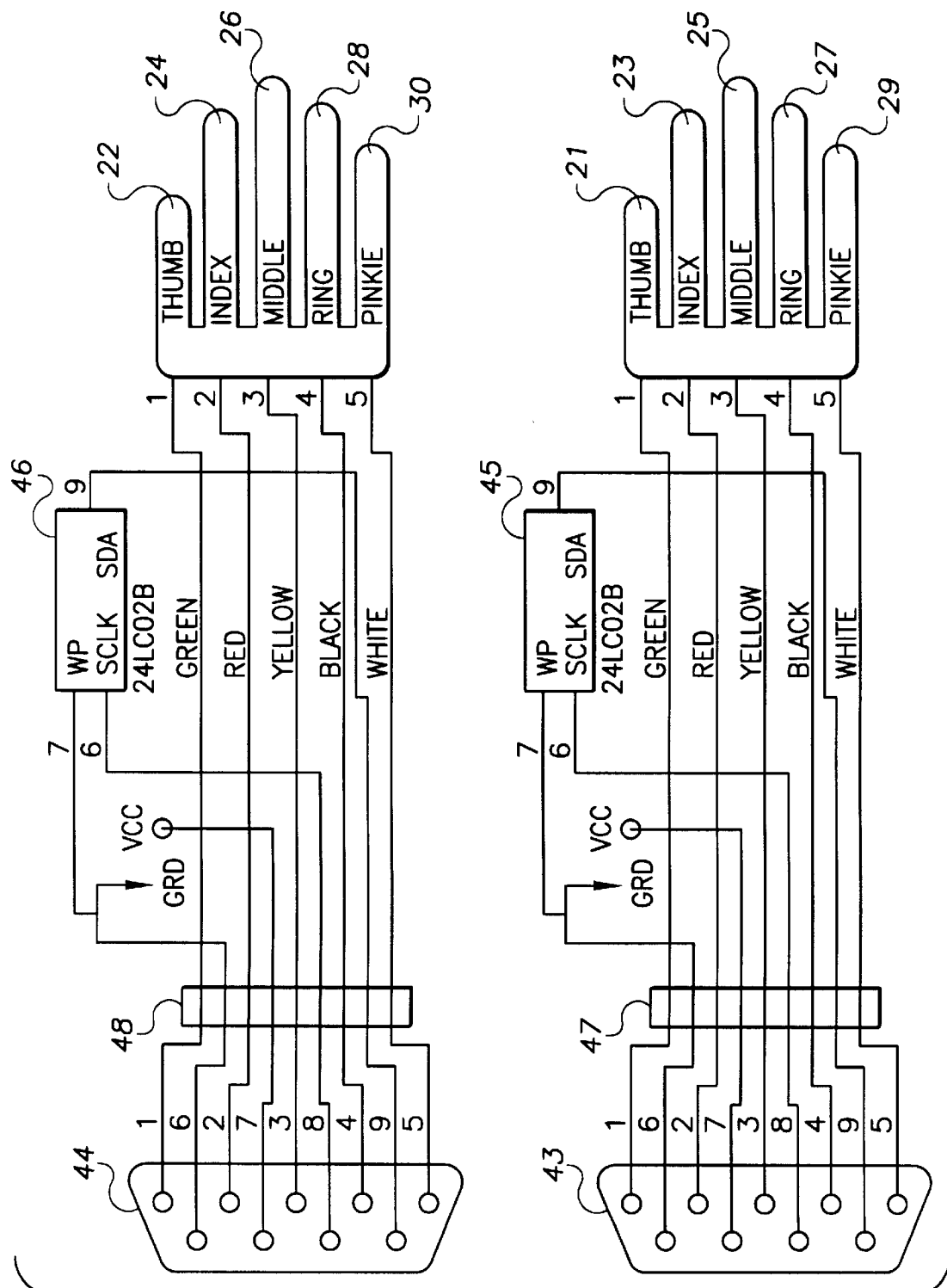
FIG. 2 is a schematic of the wiring of the data gloves.

Configuration information associated with the glove, and useful to the electronic control box and host computer is stored within the glove or its associated connector. This information is stored in serial EEPROM's 45 and 46 in the connector 43 and 44 of the glove, as shown in FIG. 2

Computer connectors such as male or female DB9 connectors may be used to connect the gloves to the electronic control box. (In gloves which have a connector at the wrist, the serial EEPROM is located on the hand, under the Velcro® pad 39, rather than in the connector which connects to the glove electronics box). This configuration information contains information regarding the size of the glove, its serial number, and other data associated with it such as the number of contacts which have been performed with the glove. Multiplexing chips 47 and 48 may be used before the connectors, and would serve to multiplex the power and sensing operations of the system to the various contacts of the hands. This would permit a connector with a minimum number of wires, and facilitate wireless communication the electronics box or host system. Multiplexing will become increasingly important as the number of sensing contacts on the gloves are increased.

Contact gloves require very little power for operation. They may be powered through the serial port or by batteries carried in the glove itself. Thus, the glove could derive power either from the serial port itself or from battery power. Gloves powered with glove mounted batteries can be advantageously combined with wireless tracking systems to allow for free movement within the virtual environment, unconstrained by wires attaching the gloves to the electronic control box or the host computer.

The connector at the wrist may be combined with the tracker-mounting hardware, thus allowing use an interchangeable glove or a disposable glove which one could put on and then when one attached the tracker-mount, the contacts for getting the gesture information back to the host computer would also be made at that time.

2. Sensing Operation

The data gloves are capable of sensing contact between any combination of sensors. By continuous and high speed switching of power and sensing between the various contacts, the system can determine any combination of contacts between all the contacts on the glove, regardless of the number of contacts. The system energizes each contact in turn, and surveys all other contacts for energization through the energized contact, thus determining which, if any, fingers are in contact with the energized electrode. After energizing one electrode and surveying all others, the system switches to the next electrode, energizes that electrode, and surveys all other electrodes for energization through the energized electrode. Continuing in this manner, all electrodes are energized in turn while system surveys the other electrodes. This operation is referred to as sequential polling or sequential strobing, and the term "poll" or "query" shall be used to refer to the operation of checking an electrode (i.e., measuring the electrical potential of the electrode) to determine if it is energized. The operation of applying an electrical potential to an electrode shall be referred to as energizing the electrode or "strobing."

Figure 3:
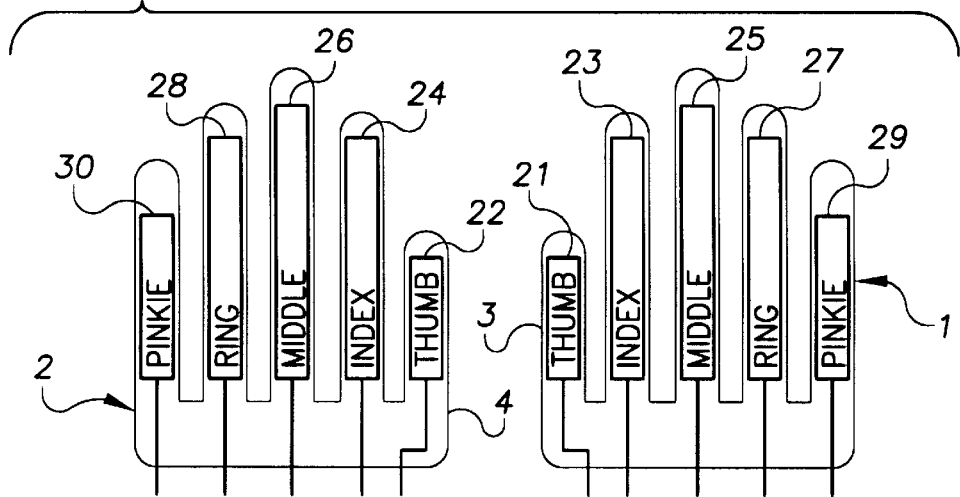
FIGS. 3 and 4 illustrate the continuous strobing operation of the glove system.

Referring to FIG. 3, the sequential polling operation is described in relationship to the glove. Starting, for example, with the right thumb, the right thumb electrode is energized with a small voltage at time T1. All other electrodes are polled to determine if the electrical potential at the electrode matches the potential applied to the thumb electrode. In FIG. 3, no fingers are touching, so no electrode will show an electrical signal indicating contact with the thumb. At time T2, the system switches to the forefinger and energizes the electrode on the forefinger while polling all the other electrodes. Again, since no fingers are touching, the no electrode will show an electrical signal indicating contact with the forefinger. The system continues to poll each electrode in turn, an drapidly determines which, if any, electrodes are in contact with the strobed electrode. In FIG. 3, there are shown ten finger electrodes, so at time T10, all the electrodes have been polled. The polling sequence occurs so rapidly that all contacts will be polled in a split second, and the sequence repeats continuously, so that any movement will be detected.

Figure 4:
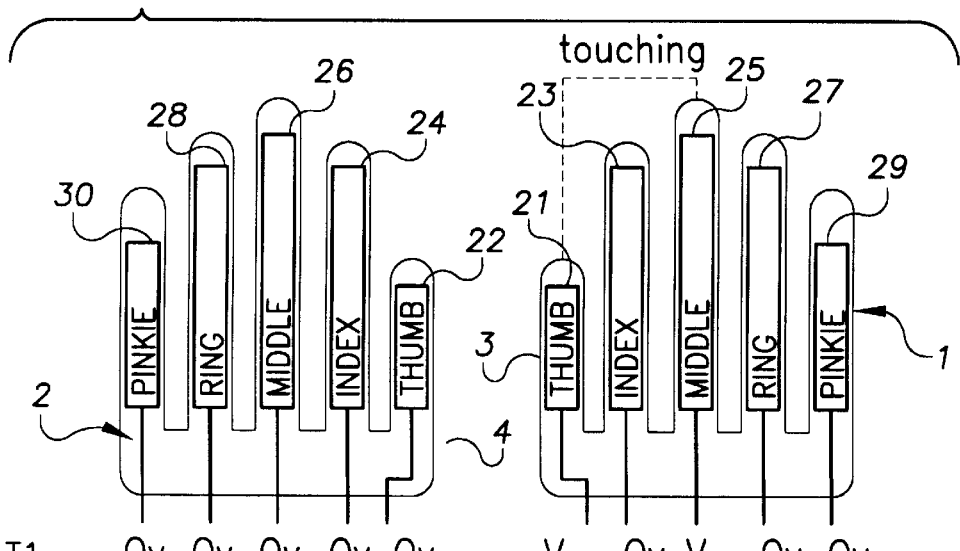

FIG. 4 illustrates what happens in the system when the operator makes a gesture with the hand causing contact between any two electrodes. In FIG. 4, the operator has chosen to touch the thumb to the middle finger. At time T1, the system will energize the thumb electrode with voltage $V_1$ and poll all the other electrodes. All the electrodes will show zero voltage, except the middle finger electrode, which will show a voltage of $V_{out}$, which will be approximatley the same as $V_1$. At this point, the system knows that the thumb of the right hand is touching the middle finger of the right hand. At time T2, the system will energize the electrode of the index finger, and poll all other fingers. The index finger is not in contact with any other electrode, so no other electrode will be at voltage $V_1$, and the system now knows that the index finger is not in contact with any other finger. Next the middle finger is energized, and all other electrodes are polled, and the system will sense electrical voltage at the thumb electrode, but no voltage will be sensed at any other electrode. The system will continue this sequential polling operation for all other fingers and electrodes, and when done will repeat the entire sequence.

The gloves perform a multiplexing function across fingers and hands. Thus, gestures are not limited to single digits touching a particular digit. For example, valid gestures include: touching between the index finger and thumb; touches between any combination of fingers; touching the index fingers, thumbs, middle fingers, ring fingers, and pinkies of right and left hands together (this gesture includes five separate independent contacts and is reported to the host computer in a single record); touching the index and middle finger of one hand to the back of the index finger on the other hand; touching the thumb of the left hand to the thumb of the right hand. The other gesture which is maximal is to touch all fingers of both hands together at one time. This can be done by kind of scrunching up the fingers as if trying to get the hand through a small bracelet and then touching the two hands together while doing this. This gesture has all fingers touching each other and is reported to the host computer as a single record.

FIG. 5 illustrates the circuitry in the interface electronics box. The power supply for the unit is shown as block 601, which is composed of a bridge diode and voltage regulator to provide clean 5-volt power for the system. Block 603 is the interface from the processor to the host computer and implements the RS 232 level shifting. Block 604 is the microcontroller which contains the firmware for communicating the state of the gloves back through RS232 interface 603 to the host computer. Block 605 is a set of DIP switches which are used to control specific features such as BAUD rate and minimum time between contacts. The controller, 604, controls the condition indicators 606 and 607. The interface between 604 and the gloves is implemented by the resistors 610 and connectors 608 and 609. The diodes, 611 and similar, provide the static protection which is necessary as there are exposed contacts on the glove.

2. Self Calibration

The touch sensing capability of the data gloves described above may be combined with a flex-sensing glove to create an auto-calibrating glove. For example, the flex-sensing glove is calibrated by making a fist and correlating the flex sensing glove output to the fist gesture. This is typically accomplished at system startup, and at intervals during use, but the calibrating operation must interrupt normal use of the glove. When combined with the touch sensing glove, the combination would allow self-calibration during use. Whenever a fist is made by the operator, the touch sensing gloves would report this to the host computer. The host computer would also have input from the flex sensors which must necessarily correspond to a closed fist. Thus, whenever the fist gesture is made, the computer system will store the data from the flex sensors in memory as the standard flex signals for the fist gesture. Thus this calibration may be entered. Also, when the hand are laid flat against each other, as in a prayer gesture, the fingers tips each touch the corresponding fingertips on the other hand, the heel contacts touch, and the distal crease contacts touch, and this necessarily corresponds to hands in the flat position. The host computer would have input from the flex sensors which must necessarily correspond to a flat hand gesture. Thus, whenever the flat hand gesture is made, the computer system will store the data from the flex sensors in memory as the standard flex signals for the flat hand gesture. This calibration may also be entered. Subsequent interpretations of intermediate gestures, such as a cupped had gesture, will be determined by the computer as a cupped hand based upon an interpolation between the flat hand and fist gestures. As the user continues using the glove, the glove may slip or stretch so that the computer system no longer accurately determines the actual flex of the hand based upon the old calibration, however, during operation, the user will return to those gestures in the natural course of operation, and the computer system will take advantage of each incidence of these gestures to recalibrate the flex sensing interpolations.

Tracker calibration can be accomplished in a similar manner. For example, if the two hands come into contact, that event will be reported if the gloves include a touch-type glove. When the touch occurs, it will be possible for the glove interface computer to calculate where the touch is occurring and to calibrate either the hand-trackers on the back of the hand, or elsewhere, relative to the flexion in the hand and the contact that is known to be occurring. The flat hand prayer gesture will provide information as to the relative locations between the trackers, and their relative orientations (in the prayer gesture, both trackers must be oriented along the same plane, and the system may use this information and the information obtained from the trackers themselves to recalibrate the trackers.

To facilitate self calibration, the operation of the system may include required calibration gestures, or it may merely opportunistically use spontaneous gestures to calibrate the system. For example, the flat hand prayer gesture (or any other gesture) may be used as a control signal, such as to start operation or reset the system, so that the calibration gesture is guaranteed to occur during normal operation.

3. Safety features

Several safety features are included in the design of the glove. The current available to each electrode is limited by power supplies with low current capabilities. Static protection circuitry including transient suppression diodes 49 are provided on the connection to the individual contacts. As these gloves have exposed contacts on the fingertips and on the back of the hand, it is reasonable to expect that there will be static events which will occur in a normal operating environment.

As the gloves have the capability to report multiple contacts as a single event, it is also important to be able to have the threshold time between the contacts to be larger than zero and ideally programmable or selectable. Detection of gestures such as pinching both the right and left hand index and thumb fingers together is enabled. For example, in order to manipulate a virtual object placed in front of the operator in the virtual environment and wish to stretch it in a particular direction, the operator can reach out and place one hand at one end of the object, place another hand at the other end of the object (position of the hands being determined in the virtual environment through the trackers), close the index and thumb finger on both hands, and then move the two hands apart. This is accomplished by having the software in the microcontroller in the glove electronics box look at the time between two events and to combine them if the time between the events is less than some programmable threshold. This provides the flexibility to have the multiple contact gestures dealt with at the microcontroller in the electronics box rather than on the host computer so that the interface is relatively straightforward on the host computer.

4. Software and Data Control

The contacts are measured in the following way: the microcontroller in the glove unit strobes through each digit making it an output while making all the other digits inputs and it then looks for those coming in while the digit is turned on. For instance, in a fraction of a second, each finger will be strobed to a high logic state while the other fingers are in the input configuration. As each finger is strobed, the microcontroller can determine which other digits are being touched at the same time. In this way, all possible combinations of touches may be recorded. They are recorded in a format which encodes contacts of the left and right hands in a pair of bites of which there can be several pairs to indicate the independent touches. In the case of two index fingers touching and the two thumbs touching that would be a total of two bites for the touch between the index fingers and two bites for the touch between the thumbs. The computer can determine that there are two independent touches occurring between those two pairs of digits. If one were to touch all four of those digits together at once, you would get back a single pair of bites with ones marked in the appropriate locations to reflect the fact that those touches were occurring.

In addition to contact information, time is also important. For example, most computer users are accustomed to the "double-clicking" function of a mouse. The data gloves described above may also be double clicked. In order to accomplish this in the smoothest fashion, the glove also reports the amount of time elapsed between the current gesture and the previous gesture transition. A gesture transition occurs either when a gesture is made or a gesture is released. For example, the operator accomplished a gesture by touching the index finger to the thumb. When the operator releases the two fingers, this also constitutes a gesture, and the time elapsed between making the gesture and releasing it is tracked and recorded by the microcontroller in the glove or by electronics in the control box. The gesture may be reported to the host computer as a double click, without having the host computer recording the time interval between the arrival of the two data packets and determine the double click. This is important because in a number of systems, particularly UNIX work stations, the time of arrival of a particular serial packet is rather difficult to determine accurately. When using things like gloves, the time periods can be quite small for rapid interaction. Thus calculation and timing within the glove system, rather than relying upon the host computer, will enhance compatibility with a wide variety of computer operating systems.

There are two kinds of data transmitted by the glove system: the contact information coming back from the glove, and status or control information. Control information includes any desired information about the gloves, such as the hand, the size the number an location of contacts, and any other information that the system can use to assist in interpretation of signals from the gloves. Contact information includes the information as to when contact is made between two (or more) fingers, and this is the data is sent to the host computer. When contact is made between fingers or electrical contacts, data reporting the contact is sent to the host computer system.

All data packets are constructed as follows:
STARTBYTE [VARIABLE NUMBER OF DATA BYTES] ENDBYTE
The STARTBYTE varies depending on the type of record being sent:

STARTBYTE (in HEX)
   0x80 Start of a message—hand data only
   0x81 Start of a message—hand data & Time stamp data
   0x82 Start of a message—text or configuration information There is only one type of ENDBYTE
ENDBYTE(in HEX)
   0x8F End of a message DATA Bytes are always 7 bits. The upper bit of control bytes is a 1 and on data bytes it is 0.

Packets with touch data are sent following a contact between fingers. They are sent to the host automatically and without hand shaking. Each data record is of one of the following two types: records with a time stamp (the default) start with 0x81 and records without time stamps start with 0x80.

The following abbreviations are used:
   S=Start Byte (0x80 or 0x81 depending on packet type)
   L=Data byte for Left hand
      Bit 7=0 6=0 5=0 4=L. Thumb 3=L. Index 2=L. Middle 1=L. Ring 0=L. Pinkie
   R=data byte for Right hand
      Bit 7=0 6=0 5=0 4=R. Thumb 3=R. Index 2=R. Middle 1=R. Ring 0=R. Pinkie
   T1=High 7 bits of time stamp, Bit 7=0 6 . . . 0=data saturates at 0x7F
   T0=Low 7 bits of time stamp, Bit 7=0 6 . . . 0=data saturates at 0x7F
   E=End byte (0x8F)

The packet formats are as follows:
With time stamp
   S [LR] . . . [LR] T0 T1 E
Without time stamp
   S [LR] . . . [LR] E
In both cases the [LR] . . . [LR] part of the record indicates one, or more, touches. There may be no [LR] entries in which case there is no touching going on. In other cases one might have several independent touches going on.

| Example Data Packets with no time stamps: | | | | | | | | | | | |
|---|---|---|---|---|---|---|---|---|---|---|---|
| 0x80 | 0x10 | 0x10 | 0x8F | | | Right thumb touching left thumb | | | | | |
| 0x80 | 0x8F | | | | | no contacts | | | | | |
| 0x80 | 0x00 | 0x18 | 0x8F | | | Right thumb touching right index finger | | | | | |
| 0x80 | 0x08 | 0x10 | 0x8F | | | Right thumb touching left index finger | | | | | |
| 0x80 | 0x00 | 0x18 | 0x18 | 0x00 | 0x8F | Right thumb touching right index and independently left thumb touching left index | | | | | |
| 0x80 | 0x10 | 0x10 | 0x08 | 0x08 | 0x04 | 0x04 | 0x02 | 0x02 | 0x01 | 0x01 | 0x8F |

This last data packet is the longest packet for a system with fingertip electrodes only and represents the "a spider on a mirror doing pushups" gesture where each digit on the left hand touches only the corresponding digit on the right hand. Where the glove is provided with heels electrodes, distal crease electrodes, and other electrodes, the data packets may be correspondingly longer.

| | | | | | | |
|---|---|---|---|---|---|---|
| Same packets as above with time stamps (1 tick = 833us): | | | | | | |
| 0x81 0x10 0x10 | 0x7F 0x7F | 0x8F | Time stamp shows > 16382 ticks elapsed since the last gesture | | | |
| 0x81 0x45 0x67 | 0x8F | | Time stamp = (0x67<<7) \| 0x45 = 13253 ticks | | | |
| 0x81 0x00 0x18 | 0x00 0x10 | 0x8F | Time stamp = (0x10<<7) \| 0x00 = 2048 ticks | | | |
| 0x81 0x08 0x10 | 0x20 0x00 | 0x8F | Time stamp = (0x00<<7) \| 0x20 = 32 ticks | | | |
| 0x81 0x00 0x18 | 0x18 0x00 | 0x18 0x18 | 0x8F Time stamp = (0x18<<7) \| 0x18 = 3096 ticks | | | |
| 0x80 0x10 0x10 | 0x08 0x08 | 0x04 0x04 | 0x02 0x02 | 0x01 0x01 | 0x7F 0x7F | 0x8F In this longest packet, time stamp indicates the previous gesture was a "long time ago" or > 16382 ticks. |

Note that time stamps tell you the elapsed time since the last gesture sent, in ticks. When the count reaches 0x7F 0x7F this saturates and does not roll over.

There are also a number of informational or control type commands which can be communicated to the host system. All commands are 2 bytes sent from the host to the glove. The system then responds some time later (within approximately 20 msec) with a packet of data. Un-recognized commands generate a reply with a body of ?. Note that as commands are 2 bytes, sending a single character will cause the system to wait and accept the first byte of any subsequent command as the completion of the present command. The system will send a ? packet if the command is not a valid one.

While the system is sending data back in response to a command, contact events may occur. In this case the packet being sent is completed and then the contact data is sent as a new packet.

Replying to a command request may take some time. Reading strings and sending them back to the host is an atomic operation and will not be interrupted once the 2 byte command has been received.

Syntax:

T [1 or 0]—Time stamp the data ON/OFF
V [0.255]—Compatibility with previous versions
CR—Right hand ASCII configuration record
CL—Left hand ASCII configuration record
CP—Processor ASCII configuration record
CT—Tick time definition

| Host Sends | Glove replies |
|---|---|
| 0x54 0x31 (T1) | 0x82 0x31 0x8F Note that 0x31 is ASCII for "1" and time stamps are turned on. |
| 0x54 0x30 (T0) | 0x82 0x30 0x8F Note that 0x30 is ASCII for "0" and time stamps are turned off. |
| 0x56 0x31 (V1) | 0x82 0x31 0x8F To support different backwardly compatible interfaces, this command sets the version of the data format to be sent by the system to the host. |
| 0x43 0x4C (CL) | 0x82 L MED GL-9999 V1.2X 999111 0x8F The glove is Left hand, MED sized, part number GL-9999, version 1.2X, serial number 999111. |
| 0x43 0x52 (CR) | 0x82 R MED GL-6001 V1.0A 566701 0x8F The glove is Right hand, MED sized, part number GL-6001, version 1.0A, serial number 566701. |
| 0x43 0x50 (CP) | 0x82 0x8F VX.XX The processor code is version X.X, informs system what software is required to use the glove presently connected |
| 0x43 0x54 (CT) | 0x82 833.3 us 0x8F Each tick is 833.3 us in length so a time stamp of 1200 ticks is really an actual elapsed time of 1200*833.3us = 1.0 seconds. This is the command to use if you want to convert the tick based time stamps to seconds. Since the value of the scaling constant may change in future versions, this command should be used to get the scale value for conversion from ticks to seconds. |

The software for controlling the flow of data to and from the gloves is set forth in detail in Appendix A.

While the preferred embodiments of the devices and methods have been described, they are merely illustrative of the principles of the invention. While the preferred embodiments have been described in the environment of a glove used ina virtual reality environment, it should be apparent from the discussion above that the application of a plurality of sensors to a moving mechanism, and the operation of sequential strobing, may be employed to many machines other than the human hand, and with many devices other than gloves. In the context of the human hand, the glove serves merely as a convenient mounting surface for the electrodes, and in other contexts other mounting surfaces, or non at all, may be employed. Other embodiments and configurations may be devised without departing from the spirit of the inventions and the scope of the appended claims. It is specifically contemplated that numerous embodiments with additional numbers and placements of electrical contacts be constructed, and also that other analogous applications of the inventions, such as the application of touch sensing contacts to any other object in a virtual environment or remote space, are enabled by the description set forth above and covered by the claims presented below.

We claim:

1. A data input glove system comprising:

a glove having a plurality flexible fabric electrode disposed thereon;

an electronic control means for supplying electrical signals to any one of the flexible fabric electrodes and for detecting electrical signals from the remaining flexible fabric electrodes, and thereafter supplying electrical signal to any other of the flexible fabric electrodes and detecting electrical signals from the remaining flexible fabric electrodes, and continuing to supplying electrical signals to the plurality of electrodes in turn while detecting electrical signals from all other electrodes.

* * * * *